United States Patent
Volos et al.

(10) Patent No.: US 12,164,640 B2
(45) Date of Patent: Dec. 10, 2024

(54) MEASURED RESTART OF MICROCONTROLLERS

(71) Applicant: Microsoft Technology Licensing, LLC, Redmond, WA (US)

(72) Inventors: Stavros Volos, Cambridge (GB); Colin Doak, Bristol (GB); Simon Douglas Chambers, Bristol (GB); David Ruggles, Bristol (GB); Richard Neal, Bristol (GB); Cedric Alain Marie Fournet, Cambridge (GB); Kapil Vaswani, Bangalore (IN); Balaji Vembu, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/508,208

(22) Filed: Nov. 13, 2023

(65) Prior Publication Data
US 2024/0086542 A1 Mar. 14, 2024

Related U.S. Application Data

(63) Continuation of application No. 17/374,900, filed on Jul. 13, 2021, now Pat. No. 11,853,429.

(51) Int. Cl.
*G06F 21/57* (2013.01)
*G06F 9/4401* (2018.01)

(52) U.S. Cl.
CPC .......... *G06F 21/572* (2013.01); *G06F 9/4405* (2013.01); *G06F 2221/033* (2013.01)

(58) Field of Classification Search
CPC . G06F 21/572; G06F 9/4405; G06F 2221/033
See application file for complete search history.

(56) References Cited

U.S. PATENT DOCUMENTS

| | | | |
|---|---|---|---|
| 2018/0089435 A1* | 3/2018 | Zander | G06F 21/577 |
| 2019/0073478 A1* | 3/2019 | Khessib | G06F 13/4282 |
| 2020/0151336 A1* | 5/2020 | Maletsky | G06F 21/575 |
| 2022/0035926 A1* | 2/2022 | Tsai | G06F 21/74 |

* cited by examiner

*Primary Examiner* — Hyun Soo Kim
(74) *Attorney, Agent, or Firm* — Barta Jones, PLLC

(57) ABSTRACT

In various examples there is a computing device comprising: a first microcontroller comprising a first immutable bootloader and first mutable firmware. The first immutable bootloader uses a unique device secret burnt into hardware of the computing device in order to generate an attestation of the first mutable firmware. The computing device has a second microcontroller. There is second mutable firmware at the second microcontroller. There is a second immutable bootloader at the second microcontroller which sends a measurement of the second mutable firmware to the first immutable bootloader whenever the second microcontroller restarts, such that the first microcontroller is able to include the measurement in the attestation.

20 Claims, 8 Drawing Sheets

MEASURED RESTART OF MICROCONTROLLERS

CROSS-REFERENCE TO RELATED APPLICATION

This application is a continuation application of and claims priority to U.S. patent application Ser. No. 17/374,900, entitled "MEASURED RESTART OF MICROCONTROLLERS," filed on Jul. 13, 2021, the disclosure of which is incorporated herein by reference in its entirety.

BACKGROUND

In some types of computing devices the identity of the computing device is known from a unique device secret (UDS) which is a cryptographic public-private key pair, or a random number, burnt into the computing device hardware during manufacture. The unique device secret is useful to enable a hardware root-of-trust whereby the computing device is able to create keys and certificates which attest to particular firmware on the computing device. In an example, a software application which uses the computing device wishes to confirm that the computing device has particular firmware installed, for security reasons. The software application wishes to receive an attestation that the firmware installed on the computing device is as expected, such as by verifying the identity of the firmware using a certificate chain. The computing device hardware is able to use the unique device secret to generate one or more public-private key pairs along with the corresponding certificates which are used by the software application to verify the firmware on the computing device.

In situations where there is more than one microcontroller on the computing device, security issues arise concerning how a hardware root of trust is implemented. It might be that only one microcontroller can implement a root of trust. It might be that not all microcontrollers do implement a root of trust.

The embodiments described below are not limited to implementations which solve any or all of the disadvantages of known microcontrollers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computing device comprising: a first microcontroller comprising a first immutable bootloader and first mutable firmware. The first immutable bootloader uses a unique device secret burnt into hardware of the computing device in order to generate an attestation of the first mutable firmware. The computing device has a second microcontroller. There is second mutable firmware at the second microcontroller. There is a second immutable bootloader at the second microcontroller which sends a measurement of the second mutable firmware to the first immutable bootloader whenever the second microcontroller restarts, such that the first microcontroller is able to include the measurement in the attestation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

It is not straightforward for a data centre tenant to receive an attestation, attesting that mutable firmware of a processing system in a data centre (or elsewhere) is as expected. A first microcontroller of the processing system implements a hardware root-of-trust and so can provide attestations of its mutable firmware using the Device Identifier Composition Engine (DICE) standard of the Trusted Computing Group (TCG) and the robust internet of things (RIoT) family of protocols. However, a second microcontroller in the processing system does not implement a hardware root-of-trust since only one entity per device is able to do so. Therefore there is a security risk since a malicious party is potentially able to tamper with or replace mutable firmware on the second microcontroller. It is difficult for an attestation to be given attesting the mutable firmware on the second microcontroller is as expected. As explained in more detail below, the inventors have devised a way to enable a measurement of mutable firmware on the second microcontroller to be generated and made available to a verifier in a secure, efficient manner. A verifier is able to use the measurement to check that the mutable firmware on the second microcontroller is as expected.

Figure 1:
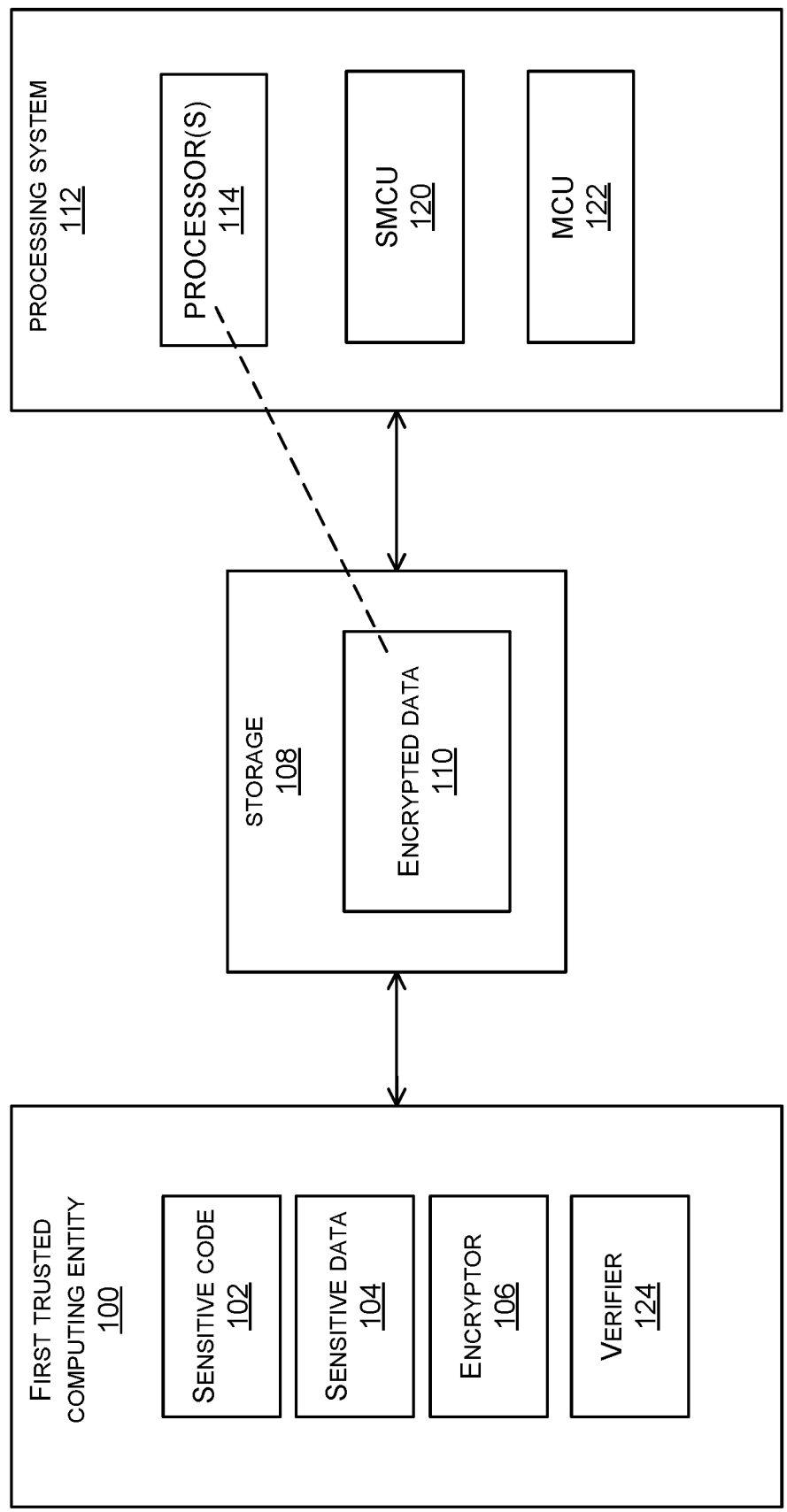
FIG. 1 is a schematic diagram of a first trusted computing entity and a processing system.

FIG. 1 shows three high level entities: a first trusted computing entity 100, storage 108 which is untrusted and a processing system 112.

The first trusted computing entity 100 is controlled by a tenant in some examples and has access to sensitive code 102 and sensitive data 104 to be processed at the processing system 112. The first trusted computing entity 100 has an encryptor 106 which encrypts the sensitive code 102 and sensitive data 104 before transfer to the processing system 112 via storage 108. The first trusted computing entity 100 has a verifier 124 which receives one or more attestations and measurements from the processing system 112 to verify that mutable firmware at the processing system 112 is as the tenant expects.

The storage 108 is any storage which is in communication with the first trusted computing entity 100 via a communications network or link, and which is in communication with the processing system 112 via a communications network or link. The storage 108 stores at least encrypted code and/or data from the first trusted computing entity 100. In some examples the storage 108 is memory of a host computing device and the processing system 112 is a peripheral device of the host computing device. However, it is not essential for the storage 108 to be at a host device. The storage 108 is any storage external to the processing system 112.

The processing system 112 is either a single processor as depicted in FIG. 1 or comprises a plurality of such processors connected together. The processing system is able to create a trusted execution environment for processing sensitive data using sensitive code. Each processor in the processing system 112 has one or more processor units 114 for processing sensitive data using sensitive code in a parallel manner. The processor units 114 are processors or other compute elements as described in detail below. The processing system 112 has encryption functionality enabling it to encrypt and decrypt information. A secure microcontroller unit (SMCU) 120 of the processing system 112 controls processes to create the trusted execution environment and various other functions. The SMCU implements a hardware root of trust. A microcontroller unit (MCU) 122 of the processing system has at least functionality to boot the processor(s).

The processing system 112 and the encryptor 106 at the first trusted computing entity are both configured to use an encryption protocol for encrypting blocks of sensitive code and/or data for transfer via the untrusted external storage 108. Any encryption protocol is usable which protects the sensitive information using keys and initialization vectors. An individual block is encrypted using a pair comprising an initialization vector and a key.

Figure 2:
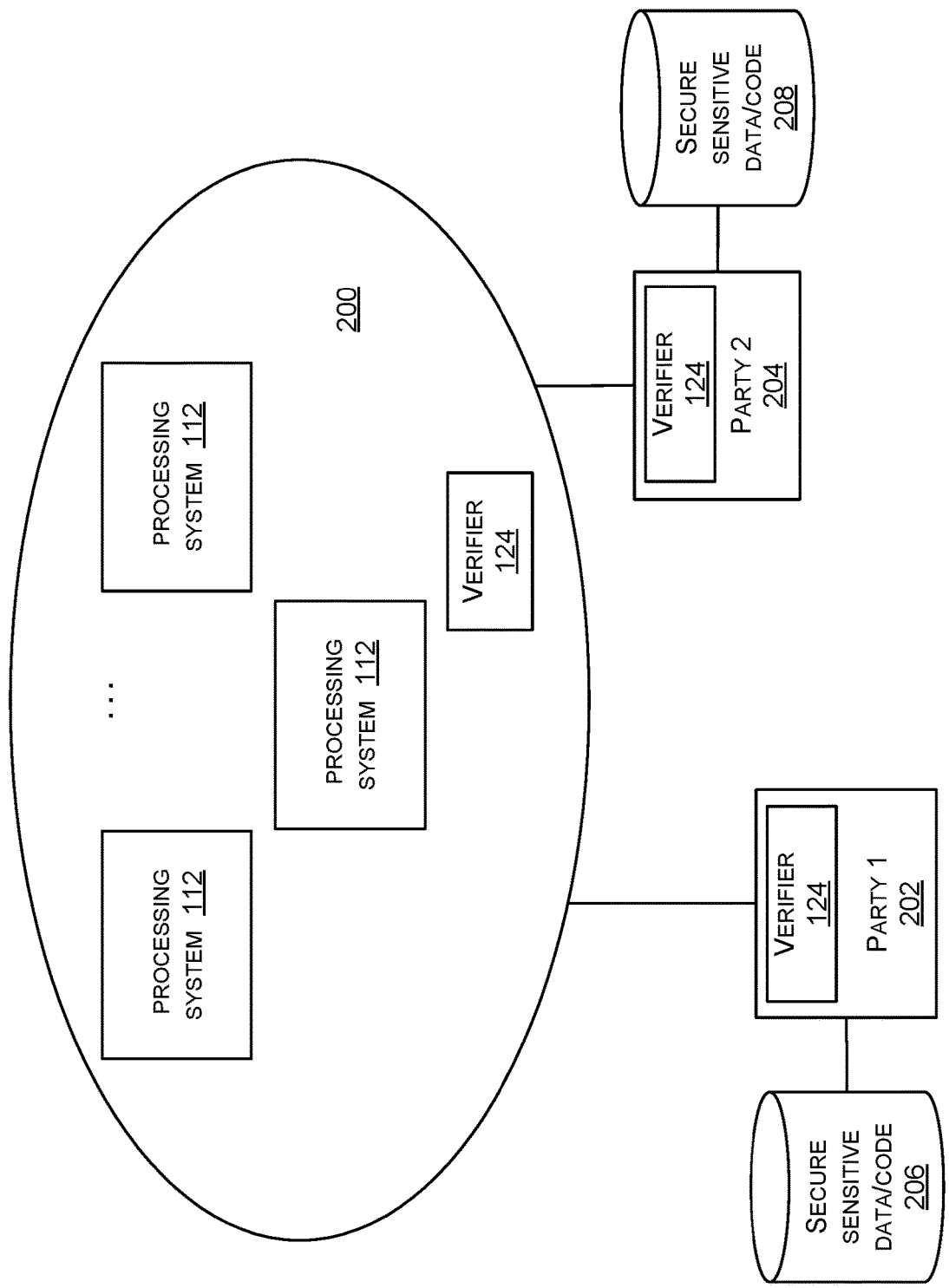
FIG. 2 is a schematic diagram of a data centre comprising a plurality of processing systems.

FIG. 2 is a schematic diagram of a data centre 300 comprising a plurality of processing systems 112. In an example, a plurality of processing systems 112 are deployed in a data center 200 where the processing systems 112 are interconnected using a communications network within the data center 200 which is not shown in FIG. 2 for clarity. A first tenant 202 comprising a computing device has a secure store 206 of sensitive data and/or code and a verifier 124. The first tenant 202 is in communication with the data center 200. The first tenant 202 is able to transfer the sensitive data and or code to the processing systems 112 so that the sensitive data is processed. In an example the sensitive code is a machine learning model and the sensitive data is training data. The first tenant 202 is able to use the verifier 124 to verify that the sensitive code is installed at one or more of the processing systems. The verification comprises receiving an attestation and/or measurement from the processing system 112 in order to check that mutable firmware at one or more of the processing systems 112 is as the first tenant 202 expects.

In some examples there is a second tenant 204 comprising a computing device in communication with the data center 200. The second tenant 204 has a secure store 208 of sensitive code and/or data. The second tenant 204 is able to copy the sensitive code and data to one or more of the same processing systems 112 in the data center 200 as the first tenant 202. Using resource isolation mechanisms in the processing systems 112 it is possible for the security of the individual tenants to be maintained. The second tenant 204 also has a verifier 124.

FIG. 2 illustrates the situation for a data center. However, it is also possible to use the processing systems 112 of FIG. 1 in stand-alone situations or in other types of deployment.

Figure 3:
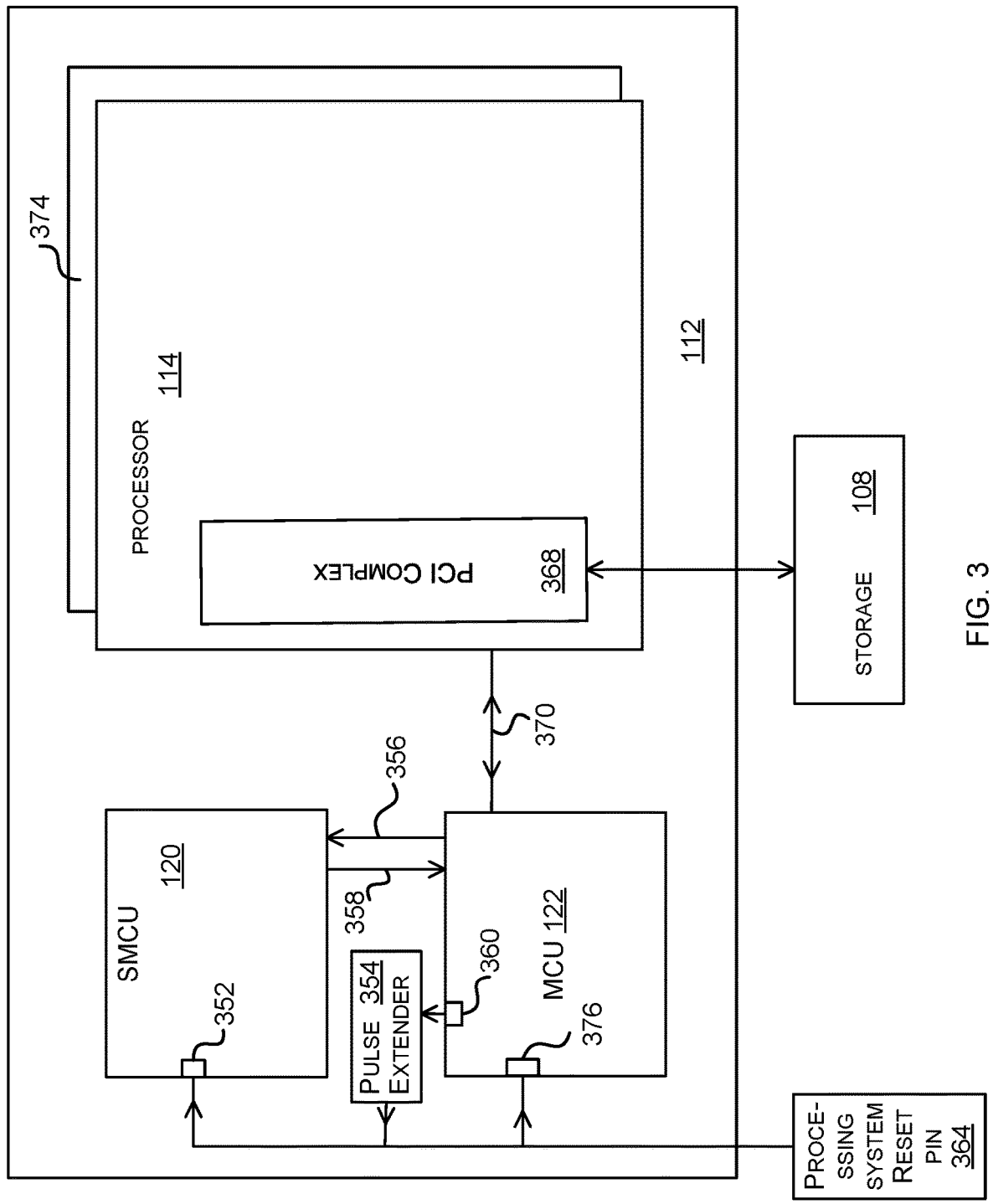
FIG. 3 is a schematic diagram of a processing system.

FIG. 3 is a schematic diagram of a processing system 112 comprising a first microcontroller which in an example is an SMCU 120, a second microcontroller which in an example is an MCU 122, and a plurality of processors 114 which each have a plurality of processing units. The processors 114 are able to transfer encrypted data to and from an external storage 108 using a peripheral component interconnect complex 368 or equivalent functionality.

The SMCU 120 implements a hardware root-of-trust using a unique device secret burnt into hardware of the processing system 112. The unique device secret is not visible in FIG. 3. The unique device secret is unique amongst devices made by the manufacturer and is a cryptographic public-private key pair, or a random number. The unique device secret is useful to enable the computing device to create keys and certificates which attest to particular firmware on the processing system. In an example, the SMCU 120 uses methods for attesting to mutable firmware at the SMCU 120 according to the Device Identifier Composition Engine (DICE) standard of the Trusted Computing Group (TCG) and the RIoT family of protocols. DICE is a standardized method to create secret keys to be used by devices for authentication, attestation, data encryption and other purposes. DICE is typically implemented in hardware or read only memory (ROM)-based firmware. Robust Internet of Things (RIoT) is a family of protocols for using DICE-derived secrets. RIoT includes protocols for device attestation whereby there is secure reporting of the firmware that booted on a microcontroller.

In an example, the SMCU 120 manages confidential computing tasks carried out on the processor(s) 114, 374. It gives each processor 114, 374 an identity based on the unique device secret. It creates and manages trusted execution environments on the processors 114, 374, measures the processor configuration, generates quotes and deploys keys for online encryption and decryption of code and data.

The MCU 122 has functionality at least for bringing up the processors 114, 374. The MCU 122 is in communication with the processors 114, 374 via a connection 370.

There is a communication channel between the SMCU 120 and the MCU 122 as indicated by arrows 358 and 356 in FIG. 3. In an example the SMCU 120 sends messages to the MCU 122 via a first interface 358; and receives messages from the MCU via a second interface 356. The communication channel between the SMCU 120 and the MCU 122 comprises a ready flag controlled by the SMCU 120. The SMCU 120 sets the ready flag high when it is ready to receive a communication. Otherwise the SMCU 120 sets the ready flag low indicating that it is not ready to receive a communication. The MCU 122 is able to observe the status of the ready flag in order to know whether the SMCU 120 is ready to receive a communication or not.

A processing system reset pin 364 can be asserted (driven low) to trigger a processing system reset. In an example where the processing system 112 is a peripheral device, a host computing device can assert (drive low) the open drain reset pin 364. The SMCU 120 has a reset pin 352. When the SMCU 120 receives an electrical pulse at its reset pin 352 which is greater than a threshold duration, the SMCU 120 undergoes a hard reset. The MCU 122 also has a reset pin 376. When the MCU 122 receives an electrical pulse at its reset pin 376 which is greater than a threshold duration, the MCU 122 undergoes a hard reset. The threshold durations are specified by manufacturers of the SMCU 120 and MCU 122. Typically, the manufacturer specifies a range of durations of the electrical pulse which will trigger a hard reset. Due to variations introduced in manufacturing there is no single fixed value for either threshold.

The reset pins 352, 376 of the SMCU 120 and MCU 122 are coupled together with the processing system reset pin 364 as indicated in FIG. 3. A general purpose input/output pin (GPIO) 360 of the MCU 122 is connected to the electrical connection coupling the SMCU 120 and MCU 122 via a pulse extender 354. The pulse extender 354 acts to prolong a pulse sent on the electrical connection by the GPIO 360 as explained in detail with reference to FIG. 5.

As described with reference to FIG. 3, a reset pin 352 of the SMCU 120 is electrically coupled to a reset pin 376 of the MCU 122. The MCU 122 has an output connected to the electrical coupling and the MCU 122 is able to send an electrical pulse from the output along the electrical coupling in order to trigger a hard reset of itself and of the SMCU. The electrical coupling comprises a pulse extender 354 which prolongs a pulse sent on the coupling by the MCU 122. The pulse extender 354 prolongs the pulse to a length of time greater than the maximum length of time for resetting the SMCU 120. Any suitable off the shelf pulse extender is useable. Without the pulse extender 354 there is a risk that the MCU 122 will reset and clear the GPIO 360 before the threshold duration for the SMCU 120 to undergo a hard reset.

Figure 4:
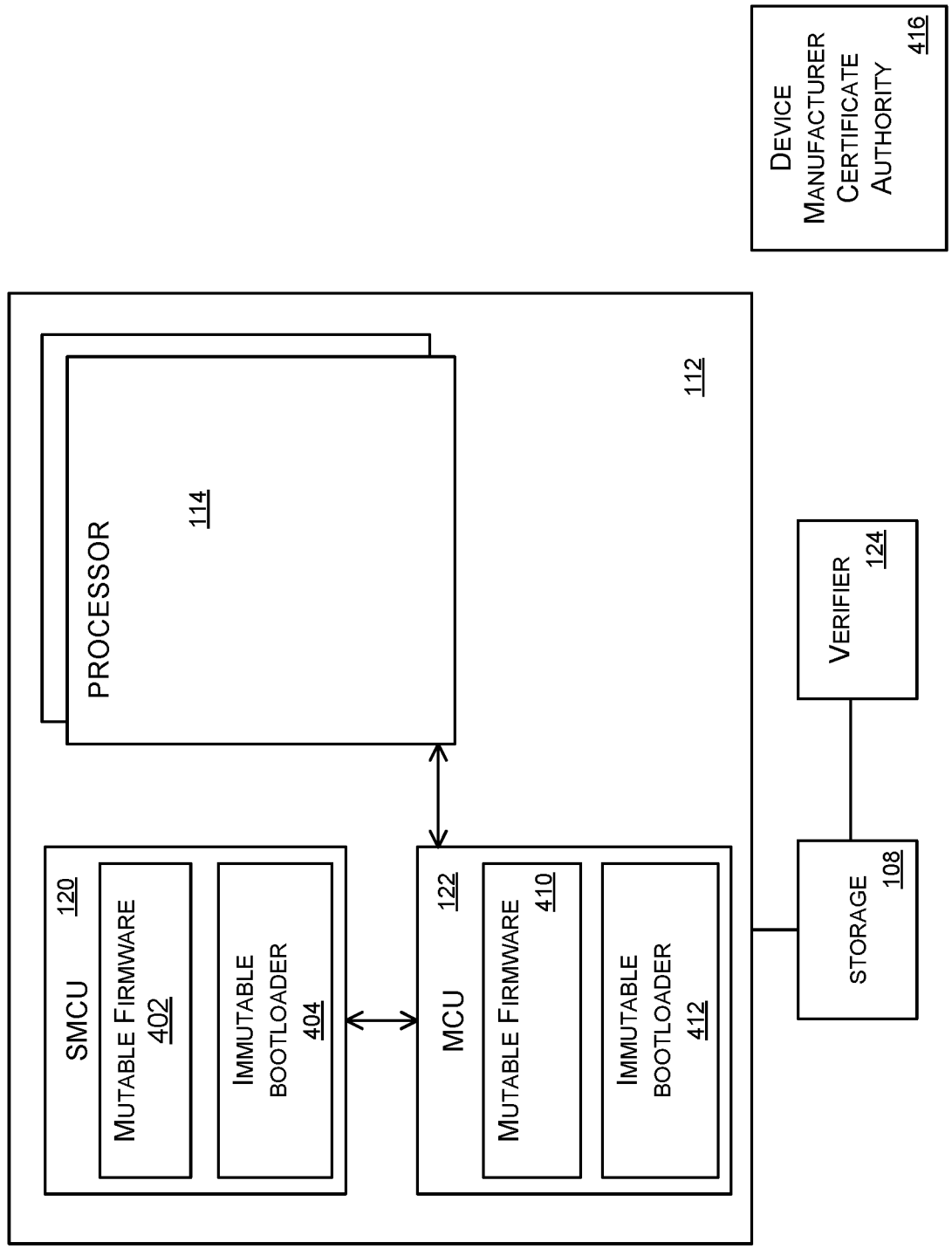
FIG. 4 is a schematic diagram of the processing system of FIG. 3 and showing immutable bootloaders and mutable firmware.

FIG. 4 shows the processing system 112 of FIG. 3 in outline and with schematic representations of at least some of the firmware on the microcontrollers. The SMCU 120, has a firmware layer which is an immutable bootloader 404 and also has mutable firmware 402. The second microcontroller, MCU 122, has an immutable bootloader 412 which is an immutable firmware layer and also has mutable firmware 410. As explained above there is a desire to enable the MCU 122 to provide a measurement of its mutable firmware 410 in a secure manner, so that a verifier 124 is able to verify that the mutable firmware 410 at the MCU is as expected. Doing so provides a way to guard against malicious parties tampering with or replacing the mutable firmware 410.

As described in more detail below, the inventors have devised a way for a measurement of the mutable firmware 410 at the MCU 122 to be taken and sent to the immutable bootloader 404 of the SMCU 120 in a secure manner. Since the immutable bootloader 404 of the SMCU 120 and the immutable bootloader 412 of the MCU 122 cannot be altered, these are trusted.

The SMCU 120 is able make the measurement of MCU mutable firmware 410 available to the verifier 124 so that the verifier 124 is able to check the MCU mutable firmware 410 is as the verifier expects. The SMCU 120 has access to the unique device secret and implements a hardware root-of-trust so that it is able to provide an attestation of its own mutable firmware 402 to the verifier according to the DICE and RiOT specifications. In some examples, the SMCU 120 computes an attestation in the form of a report that includes a firmware measurement of the SMCU 120 and MCU 122. Thus the attestation covers both the SMCU 120 and MCU 122. The verifier uses one or more certificates from a certificate authority 416 of a manufacturer of the processing system 112 to verify the attestation and measurement. The attestation is computed by the SMCU 120 by constructing a chain of certificates to be used for attestation. In the present technology, one of these certificates includes a measurement of the mutable firmware 402, 410 on the SMCU 120 and the MCU 122. These certificates are signed using keys rooted to the unique device secret.

The inventors have recognized that there are security risks associated with sending the measurement of the MCU mutable firmware 410 to the SMCU 120. Because the measurement is taken at a particular point in time, there is a possibility that the measurement could be generated and sent for the correct firmware but then slightly later, a malicious party could tamper with or replace the firmware without the SMCU 120 knowing. In order to prevent these types of scenario, the inventors have devised a way for the MCU 122 to send a measurement of the second mutable firmware to the first immutable bootloader whenever the MCU 122 restarts. Since a restart of the MCU 122 is needed in order to change the mutable firmware, then the SMCU 120 will know about the mutable firmware associated with the restart. If a malicious party changes the mutable firmware 410 at the MCU 122, the MCU 122 has to do a restart, and the SMCU 120 will receive a measurement of the mutable firmware 410.

The inventors have recognized that making the MCU 122 send a measurement whenever the MCU 122 restarts, will catch some of the security issues but not all of them. In particular, there is a potential problem where the MCU 122 sends a measurement even when it has not restarted. To overcome this the SMCU firmware is arranged to accept only measurement messages which are a first message that the SMCU 120 receives from the MCU 122 after the SMCU 120 has restarted. In an example, the SMCU firmware executed after the immutable bootloader (see 404 of FIG. 4) does not accept firmware measurement messages sent by MCU firmware layers. In this way, malicious or compromised MCU firmware cannot impersonate the MCU bootloader and send a malicious measurement.

The inventors have recognized that there are potential problems with freshness of the measurements of the MCU mutable firmware. To address this the resets of the SMCU and the MCU are coupled so that when a hard reset of the MCU happens a hard reset of the SMCU is triggered. In this way it is extremely difficult for a so called "man in the middle attack" to take place whereby a malicious party intercepts the measurement and tampers with it. Further security is added where, in the case of a soft reset of the MCU the MCU bootloader triggers a hard reset, causing a hard reset on both the MCU and SMCU. A soft reset is a reset caused by software such as where there is any of: a brown out reset, a watchdog timeout, an instruction from the SMCU is received asking the MCU to reset, a power supply glitch is detected by software at the MCU, a corruption occurs. A hard reset occurs where there is a processing system reset signal on the coupling between the reset pins of the MCU and SMCU.

Figure 5:
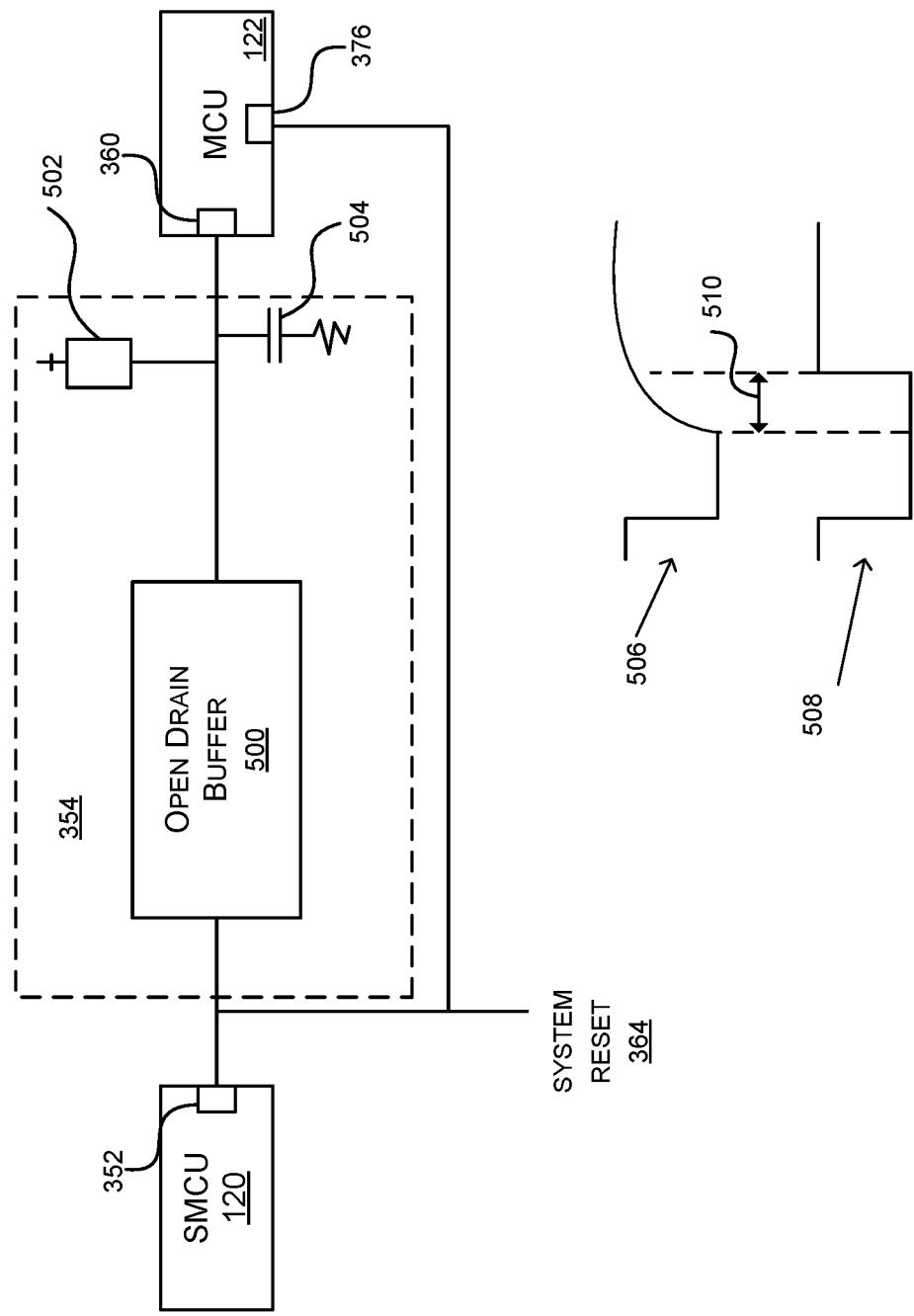
FIG. 5 is an example of a pulse extender.

In an example described with reference to FIG. 5 the pulse extender 354 comprises an open drain buffer 500, a resistor 502 and a capacitor 504. The pulse extender 354 of FIG. 5 is particularly low cost and efficient. In the example of FIG. 5 the MCU 122 has a reset pin 376 coupled to a reset pin 352 of the SMCU 120. The MCU 122 also has an output 360 (referred to as a GPIO) which is connected to the coupling between the reset pins via the pulse extender 354. The capacitor 504 is connected to ground and acts as a bucket to collect electrical charge flowing through the resistor 502.

The open drain buffer is one way, allowing voltage but not current to pass from right to left in FIG. 5, from the MCU 122 towards coupling between the reset pins. The open drain buffer's output remains low until the voltage on capacitor 504 has been charged up through resistor 502 to above its input logic switching threshold. The capacitor 504, resistor 502 and open drain buffer 500 act together to prolong an electrical pulse emanating from the MCU 122 on output 360.

A profile of the prolonged pulse is shown at 506 of FIG. 5 where voltage is on the y axis and time is on the x axis. The voltage begins high and is driven low in a step change by the output 360. The voltage stays driven low until the output 360 stops driving low when the MCU is reset at which point the voltage gradually returns to the original high level. The reason for the gradual return to the original high level (rather than a step change) is that resistor 502 takes time to charge up capacitor 504. The result from the point of view of the SMCU reset pin 352 is a prolonged pulse as indicated in profile 508 of FIG. 5.

The pulse extender 354 prolongs the pulse by a length of time 510 so that the pulse is long enough to guarantee to cause the SMCU to reset so that the MCU and SMCU reset together. In this way the MCU is unable to restart without the SMCU restarting as well. Thus the SMCU's bootloader can be ready to receive the measurement of the mutable firmware from the MCU's bootloader.

Figure 6:
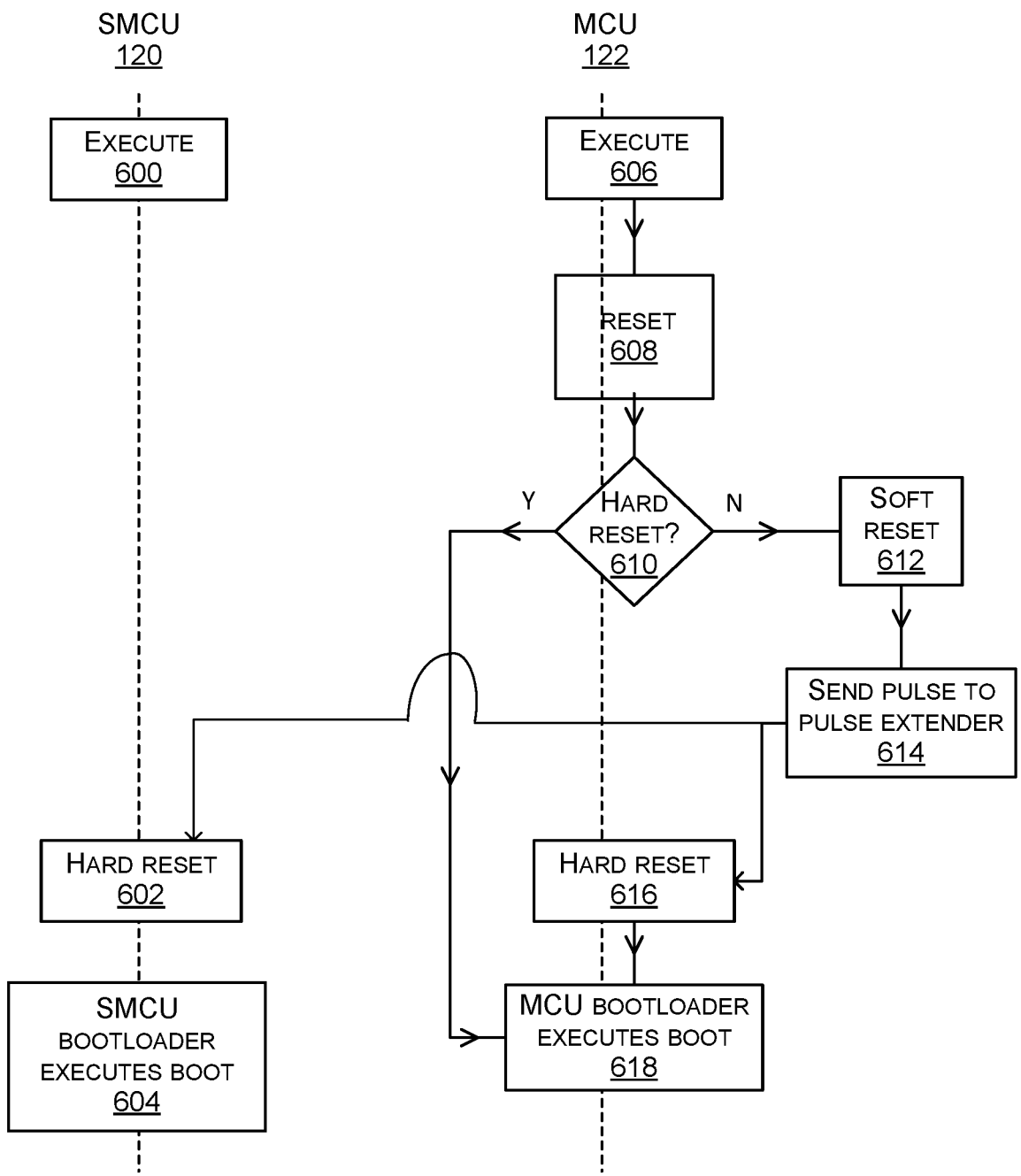
FIG. 6 is a flow diagram of a process at a first microcontroller and a second microcontroller.

FIG. 6 is a flow diagram of a process at the SMCU 120 and at the MCU 122. The SMCU 120 is represented by a vertical dotted line in FIG. 6 and the MCU 122 is also represented by a vertical dotted line. Operations are shown on the vertical dotted lines. The relative vertical positions of the operations represent chronological order.

The SMCU 120 is executing 600 and so is the MCU 122 at operation 606. The MCU experiences a reset 608 as a result of one or more criteria being met. The reset is a soft reset 608 and so the criteria are the same as for a soft reset. A non-exhaustive list of the criteria which trigger a soft reset has been given earlier in this document and is repeated here for ease of reference: reset request received from SMCU, watchdog timeout occurs, brown out occurs, power glitch detected, corruption occurs. When the MCU 122 resets 608, its bootloader executes and checks 610 whether the reset was a hard reset or a soft reset. If, at check 610 it is found that the reset was a soft reset 612, then the MCU 122 sends 614 a pulse to the pulse extender. The pulse extender triggers a hard reset 616 of the MCU and a hard reset 602 of the SMCU 120 at substantially the same time as indicated in FIG. 6. As a result of the hard reset of the MCU 122 the MCU bootloader executes a boot 618 process as described in more detail with reference to FIG. 7 or FIG. 8. As a result of the hard reset of the SMCU 120 the SMCU bootloader executes a boot 604 of the SMCU. If, at check 610 it is found that the reset was a hard reset then the process moves directly to operation 618 at which MCU bootloader executes a boot process.

As seen from FIG. 6 the MCU 122 carries out a hard reset even where a soft reset is instructed. As a result, when the MCU restarts so does the SMCU and thus the possibility of booting new MCU firmware without the SMCU's knowledge is prevented.

Figure 7:
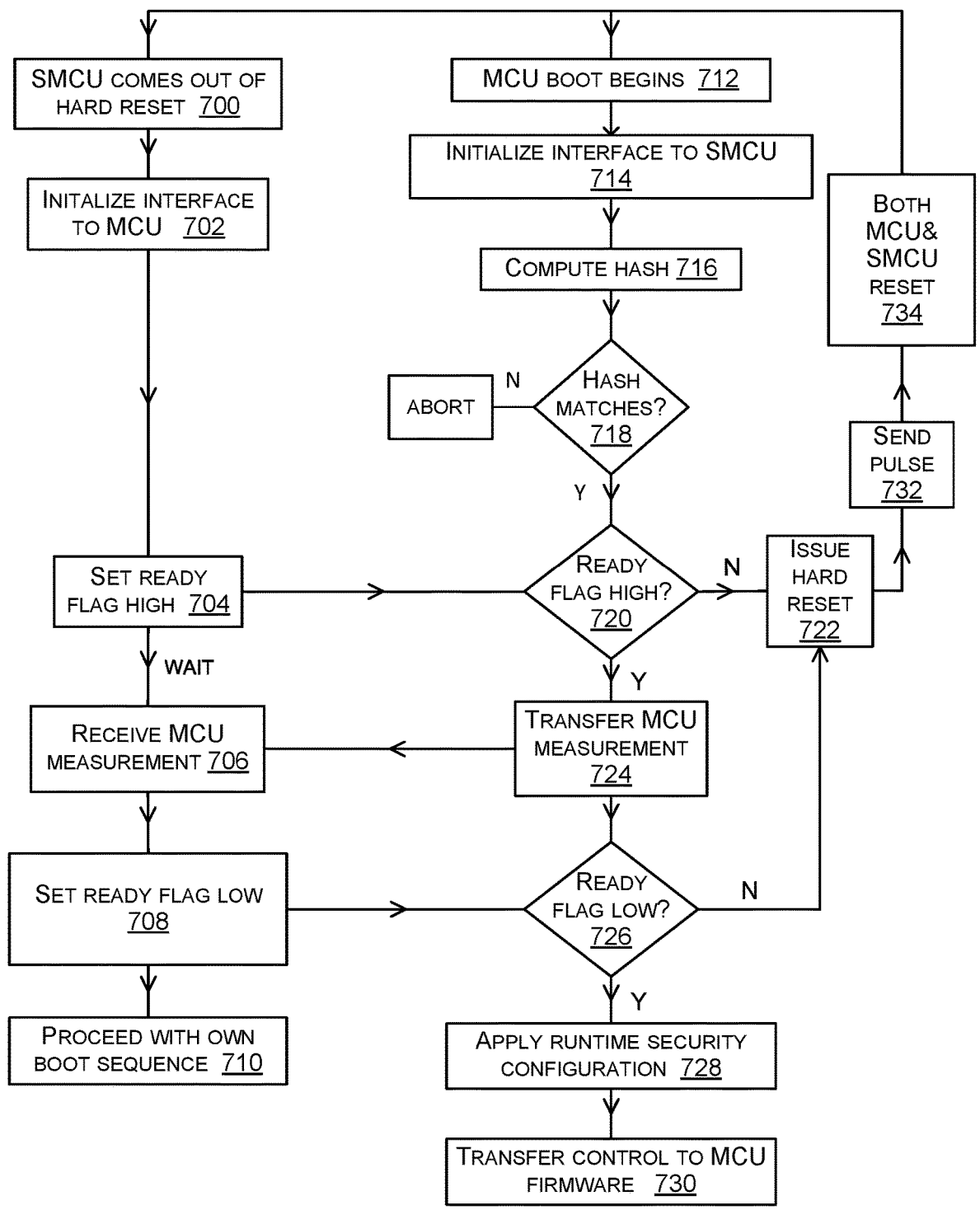
FIG. 7 is a flow diagram of a process after coming out of a hard reset at both a first microcontroller and a second microcontroller.

With reference to FIG. 7 an example process at the SMCU when the SMCU comes out of a hard reset is given on the left hand side. An example process at the MCU when the MCU comes out of a hard reset is given on the right hand side. As for FIG. 6, the relative vertical position of the operations gives a rough indication of chronological order. The operations on the left hand side are performed by the immutable bootloader of the SMCU and the operations on the right hand side are performed by the immutable bootloader of the MCU.

The SMCU comes out 700 of a hard reset. The SMCU immutable bootloader initializes 702 an interface to the MCU such as the interface 356 of FIG. 3. The SMCU immutable bootloader sets 704 a ready flag to high to indicate that it is ready to receive a measurement from the MCU over the interface 356.

In the meantime the MCU boot begins 712. The MCU immutable bootloader initializes 714 the MCU interface to the SMCU which is the interface 356.

The MCU immutable bootloader then takes the measurement of the mutable firmware at the MCU. First, the MCU immutable bootloader authenticates the MCU mutable firmware as follows. A signature appended in a firmware package containing the MCU mutable firmware is a signature over a hash of the firmware package header. The MCU immutable bootloader computes a hash of the mutable firmware header. It verifies the signature over the hash of the mutable firmware header using a public firmware signing key in order to ensure that the mutable firmware executed on the MCU has been signed by a trusted organization. If verification succeeds, it computes a hash 716 of the mutable firmware binary. At this point it is not known whether the firmware package header is consistent with the firmware package binary. In order to make sure that the firmware package header is consistent with the firmware package binary, the MCU immutable bootloader checks 718 that the hash 716 of the MCU mutable firmware binary matches the hash stored in the firmware header (the hash stored in the firmware header is a hash of the MCU firmware which has already been authenticated earlier in the process described herein). If the match is successful then the process proceeds to check 720. If the match is unsuccessful then the process aborts.

At operation 720 the MCU immutable bootloader checks whether the ready flag is set to high at the SMCU. If not then the MCU immutable bootloader waits for a pre-defined time period to give time for the SMCU to set the flag high, and issues 722 a hard reset by sending 732 a pulse to the pulse extender so that both the MCU and the SMCU reset 734 and the process returns to operations 700 and 712.

If at operation 720 the ready flag is set to high, the MCU immutable bootloader transfers 724 the measurement to the SMCU over the interface 356. The measurement is the hash of the mutable firmware binary.

After the transfer of the measurement the MCU immutable bootloader checks 726 whether the ready flag has been set to low by the SMCU. If not the MCU waits for a pre-defined time period (to give time for the SMCU to set the flag low) and then issues 722 a hard reset. If the ready flag has been set to low then the MCU immutable bootloader applies a runtime security configuration 728 and transfers 730 control to the MCU firmware.

In the example of FIG. 7 a hash of the MCU firmware is a measurement of the MCU mutable firmware and is transferred to the SMCU. Additional information is transferred in some examples, (at transfer operation 724) together with the hash of the mutable firmware binary, such as one or more of: a hash of the MCU firmware signing public key, serial numbers of the MCU, the processors and the processing unit card, a signature of the MCU mutable firmware, a security version number of the MCU mutable firmware.

In an example, the size of the information to be transferred is known to both the MCU and the SMCU in advance in order that both sides are able to know when the information transfer is complete.

Returning to the left hand side of FIG. 7, when the SMCU has received 706 the measurement of the mutable firmware at the MCU, it sets 708 the ready flag to low and proceeds with its own boot sequence 710.

The boot sequence of the SMCU comprises sending an attestation to the verifier 124. The attestation includes, among other attributes, the measurement of the mutable SMCU firmware (according to DICE and the RIoT protocols) as well as the measurement of the mutable firmware at the MCU. Using the measurements the verifier is able to check that the mutable firmware at the MCU and SMCU is as expected using conventional verification methods.

If the SMCU desires a reset of itself, then the SMCU sends a message to the MCU to request a hard reset of the MCU (which triggers a hard reset of the SMCU as well). In this way the MCU quiesces its interface with the processors and both the SMCU and MCU reset and execute their immutable bootloaders as described with reference to FIG. 7.

With reference to FIG. 7 there are at least three scenarios of the SMCU. In a first scenario, the SMCU signals (set ready flag high 704) that it is ready to receive a measurement from the MCU and the SMCU does in fact receive 706 the measurement.

In a second scenario, the SMCU signals that it is not ready to receive a measurement. In this case no ready flag is received at the MCU at decision point 720 and the MCU issues 722 a hard reset.

In a third scenario, the SMCU signals that it is ready to receive a measurement (set ready flag high 704) but it does not receive one from the MCU. In this situation the ready flag remains high (operation 704) and the MCU check 726 yields "no" leading to the MCU issuing 722 a hard reset.

Figure 8:
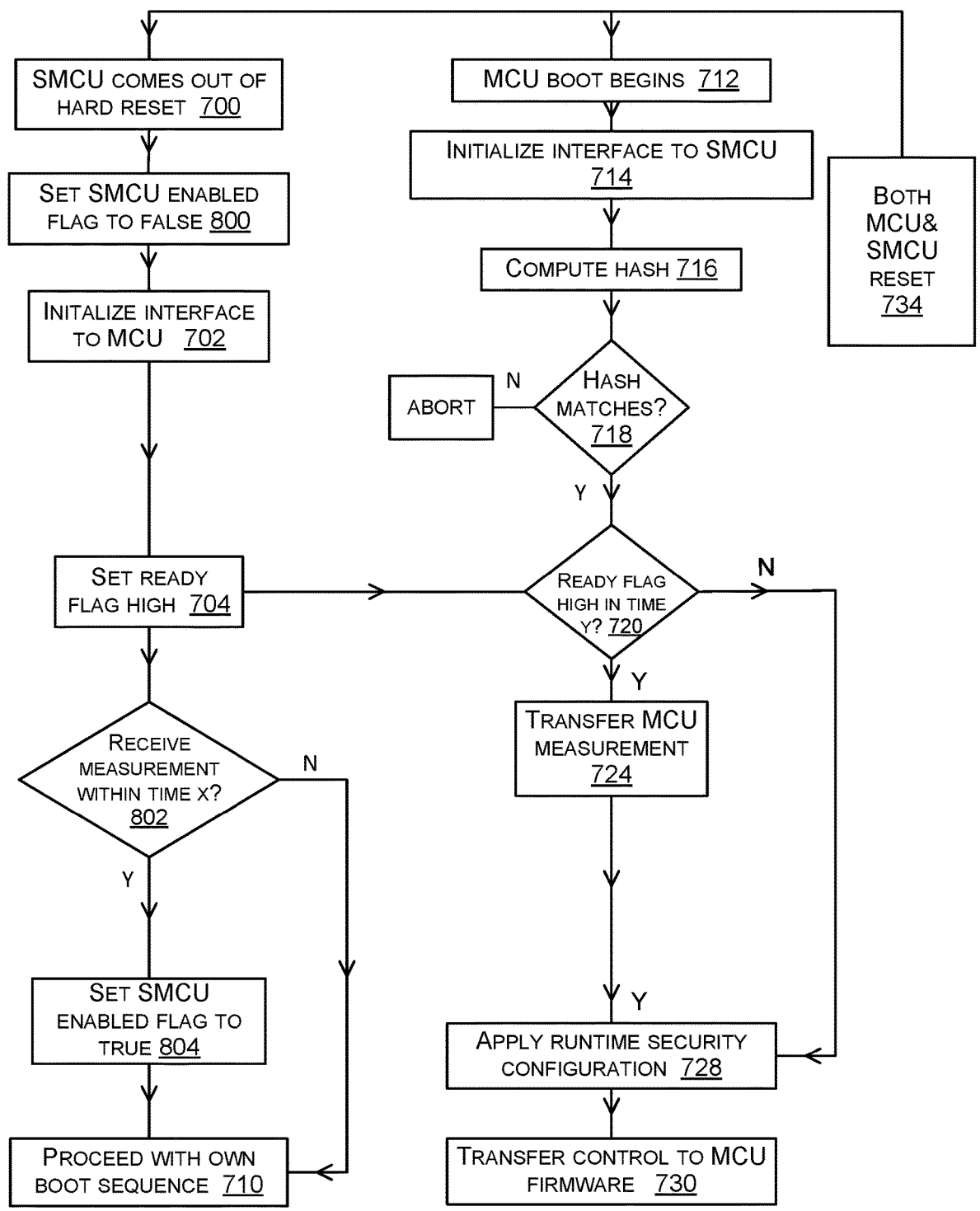
FIG. 8 is a flow diagram of another process after coming out of a hard reset at both a first microcontroller and a second microcontroller.

With reference to FIG. 8 another example process at the SMCU when the SMCU comes out of a hard reset 734 is given on the left hand side. Another example process at the MCU when the MCU comes out of a hard reset 734 is given on the right hand side. As for FIG. 6, the relative vertical position of the operations gives a rough indication of chronological order. The operations on the left hand side are performed by the immutable bootloader of the SMCU and the operations on the right hand side are performed by the immutable bootloader of the MCU.

The SMCU comes out 700 of a hard reset. The SMCU immutable bootloader sets 800 an SMCU enabled flag to false. It initializes 702 an interface to the MCU such as interface 356 of FIG. 3. The SMCU immutable bootloader sets 704 a ready flag to high to indicate that it is ready to receive a measurement from the MCU over the interface 356.

In the meantime the MCU boot begins 712. The MCU immutable bootloader initializes 714 the MCU interface to the SMCU which is interface 356 of FIG. 3.

The MCU immutable bootloader then takes the measurement of the mutable firmware at the MCU. First, the MCU immutable bootloader authenticates the MCU mutable firmware as follows. A signature appended in a firmware package containing the MCU mutable firmware is a signature over a hash of the firmware package header. The MCU immutable bootloader computes a hash of the mutable firmware header. It verifies the signature over the hash of the mutable firmware header using a public firmware signing key in order to ensure that the mutable firmware executed on the MCU has been signed by a trusted organization. If verification succeeds, it computes a hash 716 of the mutable firmware binary. At this point it is not known whether the firmware package header is consistent with the firmware package binary. In order to make sure that the firmware package header is consistent with the firmware package binary, the MCU immutable bootloader checks 718 that the hash 716 of the MCU mutable firmware binary matches the hash stored in the firmware header (the hash stored in the firmware header is a hash of the MCU firmware which has already been authenticated earlier in the process described herein). If the match is successful then the process proceeds to check 720. If the match is unsuccessful then the process aborts.

At operation 720 the MCU immutable bootloader checks whether the ready flag is set to high at the SMCU within time Y. If not then the MCU immutable bootloader moves to operation 728 at which it applies a runtime security configuration.

If at operation 720 the ready flag is set to high within time Y, the MCU immutable bootloader transfers 724 the measurement to the SMCU over the interface which was initialized at operation 714. The measurement is the hash of the mutable firmware binary. Time Y is sufficient for the SMCU to perform operations 800-704.

After the transfer of the measurement the MCU immutable bootloader applies a runtime security configuration 728 and transfers 730 control to the MCU firmware.

After operation 702, the SMCU immutable bootloader checks 802 whether it has received the MCU measurement within a specified time. The specified time at operation 802 is any time long enough so that the MCU performs operations up to operation 724. If not, it moves to operation 710 where it proceeds with it's own boot sequence so that the SMCU boots.

If the check at operation 802 finds the measurement was received in time, then the SMCU immutable bootloader sets the SMCU enabled flag to true at operation 804. The SMCU immutable bootloader then proceeds with operation 710 where it proceeds with its own boot sequence.

In the example of FIG. 8 a hash of the MCU firmware is a measurement of the MCU mutable firmware and is transferred to the SMCU. Additional information is transferred in some examples, (at transfer operation 724) together with the hash of the mutable firmware binary, such as one or more of: a hash of the MCU firmware signing public key, serial numbers of the MCU, the processors and the processing unit card, a signature of the MCU mutable firmware, a security version number of the MCU mutable firmware.

In an example, the size of the information to be transferred is known to both the MCU and the SMCU in advance in order that both sides are able to know when the information transfer is complete.

As for FIG. 7, the boot sequence of the SMCU comprises sending an attestation to the verifier 124. The attestation includes, among other attributes, the measurement of the mutable SMCU firmware (according to DICE and the RIoT protocols) as well as the measurement of the mutable firmware at the MCU if it was received in time. In an example the SMCU enabled flag is included in the attestation so that the verifier knows whether the boot handshaking was successful. In another example, the SMCU enabled flag is not included in the attestation and is omitted entirely from the method of FIG. 8 since the verifier will not validate a blank measurement anyway. Using the measurements the verifier is able to check that the mutable firmware at the MCU and SMCU is as expected using conventional verification methods.

As for FIG. 7, in the embodiment of FIG. 8, if the SMCU desires a reset of itself, then the SMCU sends a message to the MCU to request a hard reset of the MCU (which triggers a hard reset of the SMCU as well). In this way the MCU quiesces its interface with the processors and both the SMCU and MCU reset and execute their immutable bootloaders.

With reference to FIG. 8 there are at least three scenarios of the SMCU. In a first scenario, the SMCU signals (set ready flag high 704) that it is ready to receive a measurement from the MCU and the SMCU does in fact receive 706 the measurement. In this case the SMCU enabled flag is set to true such that secure operation is able to continue.

In a second scenario, the SMCU signals that it is not ready to receive a measurement. In this case no ready flag is received at the MCU at decision point 720 and the MCU applies a runtime security configuration 728. The SMCU does not have the SMCU enabled flag set and so can act accordingly to avoid setting up secure operation.

In a third scenario, the SMCU signals that it is ready to receive a measurement (set ready flag high 704) but it does not receive one from the MCU within the specified time at check 802. In this situation the SMCU proceeds with its own boot sequence at operation 710. The SMCU does not have the SMCU enabled flag set and so can act accordingly to avoid setting up secure operation.

Alternatively or in addition to the other examples described herein, examples include any combination of the following:

Clause A. A computing device comprising:
a first microcontroller comprising a first immutable bootloader and first mutable firmware, the first immutable bootloader using a unique device secret burnt into hardware of the computing device in order to generate an attestation of the first mutable firmware;
a second microcontroller;
second mutable firmware at the second microcontroller;
a second immutable bootloader at the second microcontroller which sends a measurement of the second mutable firmware to the first immutable bootloader whenever the second microcontroller restarts, such that the first microcontroller is able to include the measurement in the attestation.

Clause B. The computing device of clause A wherein a reset pin of the first microcontroller is electrically coupled to a reset pin of the second microcontroller.

Clause C. The computing device of clause B wherein the second microcontroller has an output connected to the electrical coupling and the second microcontroller is able to send an electrical pulse from the output along the electrical coupling in order to trigger a hard reset of itself and of the first microcontroller.

Clause D. The computing device of clause C wherein the electrical coupling comprises a pulse extender which prolongs a pulse sent on the coupling by the second microcontroller.

Clause E. The computing device of clause D wherein the pulse extender comprises an open drain buffer, a resistor and a capacitor.

Clause F. The computing device of any preceding clause wherein the second immutable bootloader triggers a hard reset of both the first microcontroller and the second microcontroller in response to a soft reset at the second microcontroller.

Clause G. The computing device of any preceding clause wherein the first microcontroller, responsive to a reset of the first microcontroller being requested, sends a message to the second bootloader requesting a hard reset of both the first microcontroller and the second microcontroller.

Clause H. The computing device of any preceding clause wherein the first microcontroller, responsive to coming out of a hard reset, initializes an interface to the second microcontroller, sets a ready flag to indicate availability, waits to receive a measurement from the second microcontroller over the initialized interface, and resets the ready flag to indicate receipt of the measurement.

Clause I. The computing device of any preceding clause wherein the second microcontroller, responsive to coming out of a hard reset, initializes an interface to the first microcontroller, computes a measurement of the second mutable firmware, responsive to a ready flag of the first microcontroller indicating availability, transfers the measurement to the first microcontroller over the initialized interface.

Clause J. The computing device of clause H wherein the first microcontroller carries out a boot sequence comprising making an attestation of the second mutable firmware available to a remote verifier, the attestation computed using at least the measurement from the second microcontroller and signed by a key derived from the unique device secret.

Clause K. The computing device of clause J, wherein the second microcontroller, after transferring the measurement to the first microcontroller, and responsive to a ready flag of the first microcontroller indicating receipt of the measurement applies a runtime security configuration.

Clause L. The computing device of any preceding clause wherein the second microcontroller, responsive to coming out of a hard reset, initializes an interface to the first microcontroller, computes a measurement of the second mutable firmware, and responsive to a ready flag of the first microcontroller indicating unresponsiveness after a predefined time period, either issues a hard reset command to trigger a hard reset of both the first and second microcontrollers or continues with a boot sequence.

Clause M. The computing device of any preceding clause wherein the second microcontroller, responsive to transferring a measurement of the second mutable firmware to the first microcontroller, checks a ready flag of the first microcontroller, and responsive to the ready flag indicating that the first microcontroller is ready to receive the measurement and has not received the measurement, issues a hard reset command to trigger a hard reset of both the first and second microcontrollers.

Clause N. The computing device of clause A wherein the first microcontroller, responsive to failing to receive a measurement from the second microcontroller within a time, proceeds with a boot sequence; and responsive to receiving a measurement within the time sets a flag to true.

Clause O. A method at a computing device comprising:
using a first immutable bootloader at first microcontroller to generate an attestation of first mutable firmware, the first mutable firmware being at the first microcontroller, and the attestation being signed by a key derived from a unique device secret burnt into hardware of the computing device;
using a second immutable bootloader at a second microcontroller of the computing device to send a measurement of second mutable firmware at the second microcontroller to the first immutable bootloader whenever the second microcontroller restarts, such that the first microcontroller is able to include the measurement in the attestation.

Clause P. The method of clause N comprising, prior to sending the measurement, sending an electrical pulse from an output of the second microcontroller along an electrical coupling to a reset pin of the first microcontroller and a reset pin of the second microcontroller in order to trigger a hard reset of both the first microcontroller and of the second microcontroller.

Clause Q. The method of clause O or clause P comprising prolonging the pulse such that it is longer than a reset threshold duration of the first microcontroller.

Clause R. The method of any of clauses N to Q comprising triggering a hard reset of both the first microcontroller and the second microcontroller in response to a soft reset at the second microcontroller.

Clause S. The method of any of clauses N to Q comprising, responsive to a reset of the first microcontroller being requested at the first microcontroller, sending a message to the second bootloader requesting a hard reset of both the first microcontroller and the second microcontroller.

Clause T. A peripheral computing device comprising:
at least one processor;
a first microcontroller comprising a first immutable bootloader and first mutable firmware, the first immutable bootloader using a unique device secret burnt into hardware of the computing device in order to generate an attestation of the first mutable firmware;
a second microcontroller for managing the processor(s);
second mutable firmware at the second microcontroller;
a second immutable bootloader at the second microcontroller which sends a measurement of the second mutable firmware to the first immutable bootloader whenever the second microcontroller restarts; and
wherein the peripheral computing device makes the attestation and the measurement available to a host of the peripheral computing device for access by a verifier.

Any range or device value given herein may be extended or altered without losing the effect sought, as will be apparent to the skilled person.

The systems described for implementing embodiments of the disclosure comprise data processing apparatus and functions that may be provided by means of one or more data processors. The data processors may be of any type suitable to the local technical environment, and may include one or more of, microprocessors, application specific integrated circuits (ASIC), field programmable gate arrays (FPGAs) and processors based on multi core processor architecture, as non-limiting examples. The data processing may be distributed across several data processing modules.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computing device comprising:
a first microcontroller on the computing device, the first microcontroller comprising a first immutable bootloader and first mutable firmware; and
a second microcontroller on the computing device, the second microcontroller comprising a second immutable bootloader and second mutable firmware,
the first immutable bootloader having stored therein an attestation of the first mutable firmware including:
a unique device secret burnt into hardware of the computing device,
a measurement of the second mutable firmware from the second immutable bootloader, and
wherein the second microcontroller, responsive to the first microcontroller having not received the measurement of the second mutable firmware sent by the second microcontroller, issues a hard reset command to trigger a hard reset of the first and second microcontrollers.

2. The computing device of claim 1, wherein the second microcontroller, responsive to sending the measurement of the second mutable firmware to the first microcontroller, checks a ready flag of the first microcontroller, and responsive to the ready flag indicating that the first microcontroller is ready to receive the measurement but has not received the measurement, issues the hard reset command to trigger the hard reset of the first and second microcontrollers.

3. The computing device of claim 1, wherein the first immutable bootloader accepts the measurement of the second mutable firmware upon the measurement being in an initial message that the first microcontroller receives from the second microcontroller after the first microcontroller has restarted.

4. The computing device of claim 1, wherein the second immutable bootloader checks whether a restart of the second microcontroller is a hard reset or a soft reset.

5. The computing device of claim 1, wherein a reset pin of the first microcontroller is electrically coupled to a reset pin of the second microcontroller.

6. The computing device of claim 1, wherein the second microcontroller includes an output connected to an electrical coupling between the first microcontroller and the second microcontroller, the second microcontroller being able to send an electrical pulse from the output along the electrical coupling to trigger the hard reset of the first and second microcontrollers.

7. The computing device of claim 1, wherein an electrical coupling between the first microcontroller and the second microcontroller comprises a pulse extender which prolongs a pulse sent on the electrical coupling by the second microcontroller.

8. The computing device of claim 7, wherein the pulse extender comprises at least one of an open drain buffer, a resistor, and a capacitor.

9. The computing device of claim 1, wherein the second immutable bootloader triggers a hard reset of the first microcontroller and the second microcontroller in response to a soft reset at the second microcontroller.

10. The computing device of claim 1, wherein the first microcontroller, responsive to a reset of the first microcontroller being requested, sends a message to the second immutable bootloader requesting a hard reset of the first and second microcontrollers.

11. The computing device of claim 1, wherein the first microcontroller, responsive to corning out of a hard reset, initializes an interface to the second microcontroller, sets a ready flag to indicate availability, waits to receive a measurement from the second microcontroller over the initialized interface, and resets the ready flag to indicate receipt of the measurement.

12. The computing device of claim 1, wherein the second microcontroller, responsive to corning out of a hard reset, initializes an interface to the first microcontroller, computes a measurement of the second mutable firmware, and responsive to a ready flag of the first microcontroller indicating availability, transfers the measurement to the first microcontroller over the initialized interface.

13. The computing device of claim 2, wherein the second microcontroller, after sending the measurement of the second mutable firmware to the first microcontroller, and responsive to a ready flag of the first microcontroller indicating receipt of the measurement, applies a runtime security configuration.

14. The computing device of claim 1 wherein the second microcontroller, responsive to corning out of a hard reset, initializes an interface to the first microcontroller, computes a measurement of the second mutable firmware, and responsive to a ready flag of the first microcontroller indicating unresponsiveness after a pre-defined time period, either issues a hard reset command to trigger a hard reset of the first and second microcontrollers, or continues with a boot sequence.

15. A method at a computing device comprising:
using a first immutable bootloader at a first microcontroller on the computing device to generate an attestation of first mutable firmware, the first mutable firmware being at the first microcontroller, and the attestation including a unique device secret burnt into hardware of the computing device; and
using a second immutable bootloader at a second microcontroller on the computing device to send a measurement of second mutable firmware at the second microcontroller to the first immutable bootloader whenever the second microcontroller restarts, such that the first microcontroller is able to include the measurement in the attestation,
wherein the second microcontroller, responsive to the first microcontroller having not received the measurement of the second mutable firmware sent by the second immutable bootloader, issues a hard reset command to trigger a hard reset of the first and second microcontrollers.

16. The method of claim 15, wherein the second microcontroller, responsive to sending the measurement of the second mutable firmware to the first microcontroller, checks a ready flag of the first microcontroller, and responsive to the ready flag indicating that the first microcontroller is ready to receive the measurement but has not received the measurement, issues the hard reset command to trigger the hard reset of the first and second microcontrollers.

17. The method of claim 15, wherein the first immutable bootloader accepts the measurement of the second mutable firmware upon the measurement being in an initial message that the first microcontroller receives from the second microcontroller after the first microcontroller has restarted.

18. The method of claim 15, wherein the second immutable bootloader checks whether a restart of the second microcontroller is a hard reset or a soft reset.

19. A peripheral computing device comprising:
at least one processor;
a first microcontroller on the peripheral computing device, the first microcontroller comprising a first immutable bootloader and first mutable firmware; and
a second microcontroller on the peripheral computing device, the second microcontroller comprising a second immutable bootloader and second mutable firmware,
the first immutable bootloader having stored therein an attestation of the first mutable firmware including:
a unique device secret burnt into hardware of the peripheral computing device,
a measurement of the second mutable firmware from the second immutable bootloader, and
wherein the second microcontroller, responsive to the first microcontroller having not received the measurement of the second mutable firmware sent by the second microcontroller, issues a hard reset command to trigger a hard reset of the first and second microcontrollers; and
wherein the peripheral computing device makes the attestation available to a host of the peripheral computing device for access by a verifier.

20. The peripheral computing device of claim 19, wherein the second microcontroller, responsive to sending the measurement of the second mutable firmware to the first microcontroller, checks a ready flag of the first microcontroller, and responsive to the ready flag indicating that the first microcontroller is ready to receive the measurement but has not received the measurement, issues the hard reset command to trigger the hard reset of the first and second microcontrollers.

* * * * *